April 1, 1924.  
F. HALL  
ARTIFICIAL BAIT  
Filed Feb. 3, 1923

1,489,207

Floyd Hall
INVENTOR
BY Victor J. Evans
ATTORNEY

WITNESS: H. A. LaClair

Patented Apr. 1, 1924.

1,489,207

UNITED STATES PATENT OFFICE.

FLOYD HALL, OF MUSKEGON, MICHIGAN.

ARTIFICIAL BAIT.

Application filed February 3, 1923. Serial No. 616,788.

*To all whom it may concern:*

Be it known that I, FLOYD HALL, a citizen of the United States, residing at Muskegon, in the county of Muskegon and State of Michigan, have invented new and useful Improvements in Artificial Bait, of which the following is a specification.

This invention relates to fishing and trapping and has particular reference to artificial fish bait and the principal object of the same is the provision of a casting and trolling bait which when drawn through the water will accurately simulate the movements of a live minnow, swimming in a zigzag course near the surface of the water or beneath the same more or less deeply, as it is drawn through the water with varying speed.

Another object of the invention is to provide an efficient and deceptive bait which can be cheaply produced, and which is by reason of its simplicity of form and construction, less subject to wear and disarrangement than is usual with artificial baits.

With these objects in view, the invention consists in the construction and configuration of the parts as hereinafter explained, claimed and illustrated in the accompanying drawings, in which:

Figure 1:
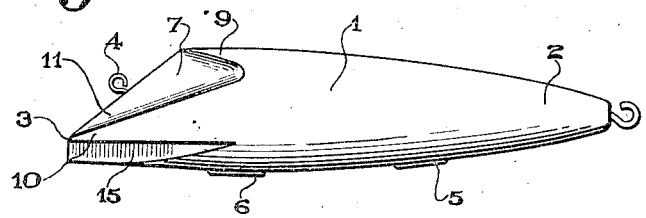
Figure 1 is a side elevation of an artificial bait embodying my invention.
Figure 2:
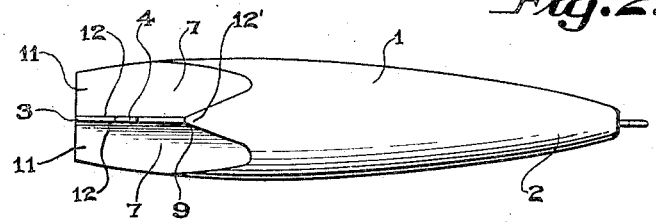
Figure 2 is a top plan view of the bait body.
Figure 3:
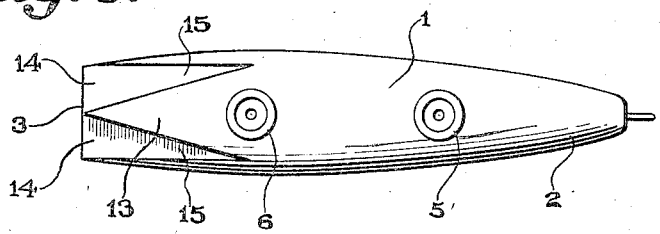
Figure 3 is a bottom plan view of the bait body.
Figure 4:
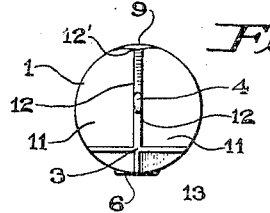
Figure 4 is an end elevation thereof.
Figure 5:
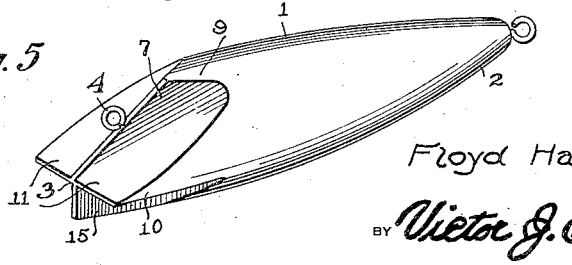
Figure 5 is a perspective view.

The artificial bait comprises the usual buoyant conoidal body 1 having a tapering tail 2, and a blunt forward or penetrating end 3 provided with a suitable line securing element 4. The tail and bottom edge are likewise provided with like elements 5 and 6 respectively. The hooks are not shown in the drawings, as they may be of a size or shape as necessity may demand, and are so arranged relative to each other as to maintain the body in a horizontal plane when floating at rest.

The principal feature of the invention is the provision of the relatively enlarged penetrating end 3 having formed therein longitudinal concaved portions 7 which are gradually flattened toward the end 3, and the inner extremities are directed upward to form a thickened wall 9 which is downwardly inclined at an angle as at 10 to the edge 3 thereby forming deflecting portions 11 upon either side, and causes deflection by the cheeks 12 provided by the tapered or wedge shaped surface 12' which becomes a part of the inclined wall 10.

The bottom portion of the penetrating edge 3 is provided with a V or wedge shaped deflector 13 and lateral surfaces 14 which merge to form tapered fillets 15. By reason of the widening of the portions 7 toward the end, and on account, of the tapering fillets and wedge, a penetrating edge is formed which when drawn through the water will cause the bait to sink more or less deeply below the surface, depending upon the speed, and varying water pressure upon the lateral extension 7, cheeks 12, lateral surfaces 14, fillets 15, and bottom wedge 13 causing the bait to progress through water with a wavering, sinuous motion closely simulating the swimming of a minnow or other small fish.

Thus, I provide a very efficient bait which is deceptive, simple in its form and comparatively inexpensive.

It will be understood, that minor changes in size, shape and proportions may be resorted to without departing from the invention and appended claim.

Having thus described my invention what I claim and desire to secure by Letters-Patent is:

An artificial bait comprising a conical buoyant body having formed in its surface a pair of longitudinal concaved portions, providing a dividing wall therebetween, said wall being thickest at its inner end and inclined forwardly to the penetrating edge to provide wedge shaped deflecting walls, and a second wedge shaped deflecting wall directly therebeneath, the last mentioned wall being of a greater width than the first mentioned wall, and a dividing laterally extending wall therebetween.

In testimony whereof I affix my signature.

FLOYD HALL.